UNITED STATES PATENT OFFICE.

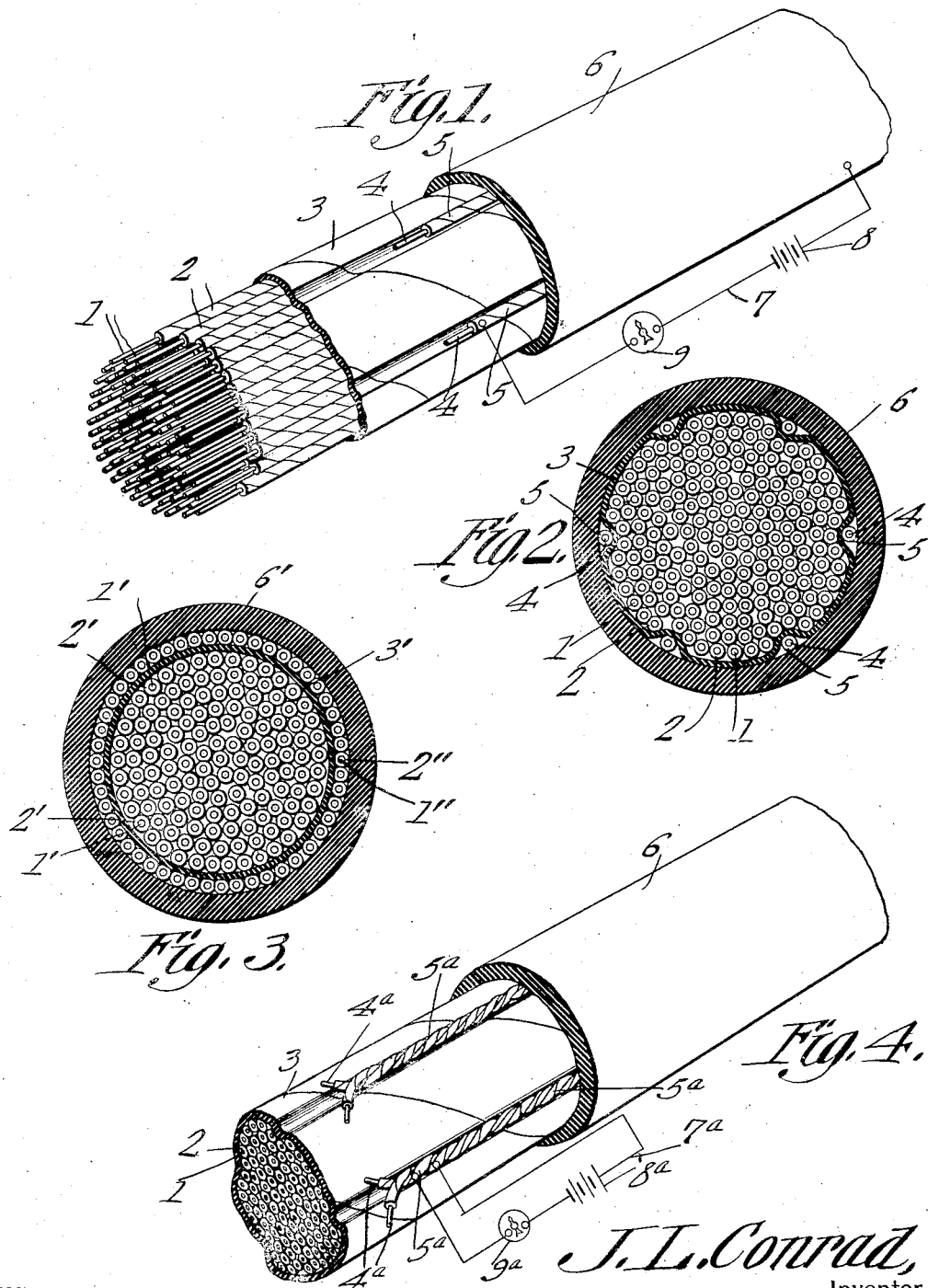

JOSEPH L. CONRAD, OF DURHAM, NORTH CAROLINA, ASSIGNOR OF ONE-THIRD TO THOMAS D. WRIGHT AND ONE-THIRD TO ARVID S. HALSTROM, OF DURHAM, NORTH CAROLINA.

ELECTRIC CABLE.

1,157,208. Specification of Letters Patent. Patented Oct. 19, 1915.

Application filed December 3, 1914. Serial No. 876,152.

*To all whom it may concern:*

Be it known that I, JOSEPH L. CONRAD, a citizen of the United States, residing at Durham, in the county of Durham and State of North Carolina, have invented a new and useful Electric Cable, of which the following is a specification.

The present invention appertains to electric cables, and aims to provide an electric cable provided with novel means to facilitate the location and clearing of faults or defects in the cable, in order that the faults or defects may be remedied before the service is impaired, or considerable damage done.

As a more specific object, this invention aims to provide an electric cable with means, whereby a detector circuit may be set up, in the presence of moisture within the sheath or casing of the cable, in order that the detector circuit will serve as a pilot or tracer to locate the fault or defect, and enable the same to be quickly repaired before the moisture penetrates to the active or service conductor or conductors.

It is also within the scope of the invention, to provide a cable provided with detecting means of the nature indicated, which will be comparatively simple and inexpensive to manufacture, and which will be efficient and practical in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a fragmental perspective of an electric cable embodying the present improvements. Fig. 2 is a cross sectional view thereof. Fig. 3 is a cross sectional view of another cable embodying a modification. Fig. 4 is a view similar to Fig. 1, illustrating a variation.

In the drawing, there is illustrated a multi-wire core embodying a plurality of conductors or wires 1, each of which is wrapped or covered by suitable insulation 2, although it is to be understood that the core may comprise a single conductor or wire with the same result.

In carrying out the invention, the conductors or core wires 1, having the insulation 2, are embraced by a wrapping, braiding or layer of insulation 3 of any suitable material, and which may be saturated with a suitable moisture-proof material or compound, to render the insulation 3 moisture-proof, for protecting the core or conductors. Surrounding the insulation 3, are a plurality of detector conductors or wires 4, which are spaced suitably about the periphery of the insulation 3, and each of the conductors or wires 4 is wrapped or otherwise covered with an absorbent moisture-attracting insulation 5, which is preferably saturated or impregnated with a chemical solution, composition or substance, such as salts or potassium, to facilitate the attraction of moisture adjacent the detector conductors 4.

The sheath or casing 6 which may be of lead or other suitable material, embraces and incloses the foregoing parts, and serve as a moisture and acid-proof covering for the main conductors 1 and the auxiliary or detector conductors 4.

There is illustrated in Fig. 1, a conductor 7 connected at one terminal to the conductor 4, and at the other terminal to the sheath 6, so as to be in circuit with the conductor 4 and sheath 6, the conductor 7 being provided with a battery or other suitable source of electric current 8, and having interposed therein, a galvanometer or current detector 9. Thus, should the seal of the cable be broken, and the moisture attracted by the insulation 5 of the detector conductor 4, a circuit would be set up through the conductor 7, sheath 6, and conductor 4, and the galvanometer or indicator 9 would warn the attendant or observer of the defect or fault in the cable, and through the medium of the detector conductors 4, the fault or defect could be traced by using the conductors 4 as pilots, in connection with suitable apparatus for the purpose, it being observed that the nearer the galvanometer conductor 7 is located to the defect, the greater will be the deflection of the galvanometer needle. Thus, when a defect or fault occurs, this fact will be signaled by the deflection of the galvanometer needle, and by moving the conductor 7 along the cable, the ends of the conductor 7 being connected to one conductor 4 and the sheath 6 at the various positions of the conductor 7, the galvanometer needle will be deflected more or less, due to the fact that the conductor 7 is either nearer or farther away from the defect. The greatest amount of deflection of the galvanometer needle will occur adjacent the defect, so that it is comparatively easy for the defect or fault to be located. If the resistance of the conductors 4 and sheath 6 is known, as well as the voltage of the battery 8, the approximate distance between the defect and conductor 7 may be determined by noting the amount of deflection of the galvanometer needle or pointer, as will be apparent to those versed in the art, since the farther away the defect is from the conductor 7, the greater will be the resistance offered by the sheath 6 and respective conductor 4, and the less will be the deflection of the galvanometer needle. It is assumed that in the case above mentioned, the sheath or casing 6 is of lead or other material which is a conductor of electrical energy.

In case that the sheath or casing 6 is a non-conductor, the detector conductors 4ª which are disposed between the insulation 3 and sheath 6, are arranged in pairs, being preferably intertwisted, and they are normally insulated from each other by the absorbent moisture attracting insulations 5ª thereon. With the use of the pair of detector conductors 4ª, the terminals of the conductor 7ª having the battery or source of current 8ª and the galvanometer or detector 9ª interposed therein, are connected to the conductors 4ª of the respective pair, and should moisture be present within the sheath 6, the same would be attracted by the insulations 5ª of the pair of conductors 4ª, which would close the circuit through the conductors 4ª and 7ª so that the galvanometer 9ª would indicate the fact that a fault or defect has occurred in the cable.

The insulation 3 is of advantage, since it provides a second moisture-proof seal around the core or main conductor or conductors, so that a leakage or seepage of moisture through the sheath 6, will not immediately result in the penetration of the moisture to the core, since the insulation 3 would exclude the moisture from the core, for a sufficient length of time, until the fault or defect could be located and repaired. The use of the absorbent moisture attracting insulations 5 for the detector conductors 4 is of prime importance, since it enables the detecting current to be set up immediately after the seal of the cable is broken and moisture is admitted into the sheath, and it is therefore possible for the break to be located with comparative ease, so that the fault or defect can be repaired without damage to the core or conductors and a resultant impairment or interference with the electrical service of whatever character it is, it being noted that the present invention may be employed upon telephone, telegraph, lighting or other cables with equal propriety and success. The utility of the invention is enhanced materially if the insulation 5 of each detector conductor 4 is saturated or impregnated with the salts of potassium or other chemical solution, compound or substance for attracting moisture, which will liquefy when exposed to air, to quicken the closing of the detector circuit.

The detector conductors in the forms illustrated in Figs. 1, 2 and 4 preferably lie dormant or inactive under normal conditions, whereas in the form illustrated in Fig. 3, a portion of the live or active conductors are utilized as detector conductors. Thus, Fig. 3 illustrates an ordinary cable embodying the insulated core or conducting wires inclosed by a lead or other sheath or casing 6'. The core wires or conductors are divided into a central group 1' and a surrounding layer or group 1''. A moisture-proof insulation 3' is twisted or otherwise provided around the central conductors 1', to exclude moisture from the selected central conductors, whereas the outer conductors 1'' are disposed outside of the insulation 3' to be first exposed to any moisture present within the sheath 6'. The insulation 2' of the central conductors 1' may be of any suitable character, and need not especially be moisture-proof, since the central conductors are protected sufficiently by the insulation 3', but the insulation 2'' of the outer conductors 1'' is of cotton, silk, paper or other suitable absorbent material, and is preferably saturated or impregnated with the moisture attracting chemical or substance above referred to. Thus, the outer conductors 1'' will serve as detector conductors, the same as the detector conductors above described, and the detecting circuit may be set up through one or more of the conductors 1'' in the same manner, and without interfering with the normal use of the conductors 1''.

The manner of establishing the detecting circuit through the detector conductor or conductors is only illustrated in its simplest form in the drawing, and in practice may be more elaborate and expensive, but since the present invention relates to the cable *per se* and not the detecting apparatus, the latter need not be described or illustrated as used in actual practice.

What is claimed is:—

1. An electric cable comprising a moisture-proof sheath, an insulated conducting core therein, a detector conductor within the sheath, and an absorbent moisture-attracting insulation for the detector conductor to enable a detecting circuit to be established through the detector conductor in the presence of moisture within the sheath.

2. An electric cable comprising a moisture-proof sheath, a conductor core therein, a moisture-proof insulation surrounding the core, a detector conductor between the said insulation and sheath, and an absorbent moisture-attracting insulation for the detector conductor to enable a detecting circuit to be established through the detector conductor in the presence of moisture within the sheath.

3. An electric cable comprising a moisture-proof sheath, an insulated conductor core therein, a detector conductor within the sheath, and an insulation for the detector conductor impregnated by a moisture-attracting substance, to enable a detecting current to be established through the detector conductor in the presence of moisture within the sheath.

4. An electric cable comprising a moisture-proof sheath, a conductor core therein, a moisture-proof insulation surrounding the core, a detector conductor between the insulation and sheath, and an insulation for the detector conductor impregnated by a moisture-attracting substance, to enable a detecting circuit to be established through the detector conductor in the presence of moisture within the sheath.

In testimony that I claim the foregoing as my own, I have hereto affixed my signature in the presence of two witnesses.

JOSEPH L. CONRAD.

Witnesses:
 C. C. MYERS,
 A. L. KIRKLAND.